June 26, 1962 J. B. CHATTEN 3,041,391

COLOR TELEVISION RECEIVER INDEXING APPARATUS

Filed Oct. 23, 1958 4 Sheets-Sheet 1

INVENTOR.
JOHN B. CHATTEN
BY
Nelson E. Kimmelman
ATTORNEY

June 26, 1962 J. B. CHATTEN 3,041,391

COLOR TELEVISION RECEIVER INDEXING APPARATUS

Filed Oct. 23, 1958 4 Sheets-Sheet 2

INVENTOR.
JOHN B. CHATTEN
BY
Nelson E. Kimmelman
ATTORNEY

June 26, 1962 J. B. CHATTEN 3,041,391

COLOR TELEVISION RECEIVER INDEXING APPARATUS

Filed Oct. 23, 1958 4 Sheets-Sheet 3

INVENTOR.
JOHN B. CHATTEN
BY
Nelson E. Kimmelman
ATTORNEY

COLOR TELEVISION RECEIVER INDEXING APPARATUS

Filed Oct. 23, 1958 4 Sheets-Sheet 4

ULTRA-VIOLET EMISSIVE PHOSPHORS

INFRA-RED EMISSIVE PHOSPHORS

INVENTOR.
JOHN B. CHATTEN
BY
Nelson E. Kimmelman
ATTORNEY

United States Patent Office 3,041,391
Patented June 26, 1962

3,041,391

COLOR TELEVISION RECEIVER INDEXING APPARATUS

John B. Chatten, Philadelphia, Pa., assignor, by mesne assignments, to Philco Corporation, Philadelphia, Pa., a corporation of Delaware Filed Oct. 23, 1958, Ser. No. 769,156
28 Claims. (Cl. 178—5.4)

This invention relates to novel cathode ray tube systems and in particular to novel television receiving systems for the reproduction of scenes televised in color.

One of the number of systems devised for the reception of color television signals is commonly known as the "parallel-scan" type. In this type of system a cathode ray tube is used which contains a beam-intercepting structure constituted in part of a fluorescent screen having a plurality of sets of strips of phosphor materials which are disposed substantially parallel to one another. Each of the sets of phosphor strips emits light of a particular color when bombarded by an electron beam. One or more electron beams are used to scan such structure in a plurality of scanning paths whose axes are generally parallel to the direction in which the sets of phosphor strips are disposed. The strips are made very fine and are positioned close together so that when they are scanned the eye merges the light emitted into a color picture. In one form of parallel-scan system wherein the beam is modulated in intensity by signals representative of the color of elements of the televised scene as they are scanned it is essential, in order that the reproduced image be faithful in color to the televised scene, that the intensity of the beam (or beams) be modulated by say, a red-representative signal when the beam is scanning a red-emissive phosphor strip. In order to coordinate the intensity modulation of the beam with the position of the latter, indexing systems have hitherto been employed which usually involved "indexing elements" disposed parallel to the phosphor strips on the beam-intercepting structure and which emitted detectable signals when the scanning beam impinged upon them.

It was also customary in previously known systems to "wobble" the beam, that is to say, in the course of the scanning of the beam in its path, an additional cyclical deflection transverse to the direction in which the paths extended was imparted to the beam which thereupon traversed the phosphor strips and indexing elements in a cyclical manner. This auxiliary deflection served several purposes, one of which was to generate a cyclically varying A.-C. indexing signal even though the beam was scanning paths generally parallel to the indexing elements. This indexing signal could then be compared in frequency and/or phase with a reference signal so as to derive an error signal for controlling the vertical position of the beam so that the beam would, for example, scan a phosphor strip emissive of green light at a time when the beam intensity corresponded to a green-colored element of the scene televised. Necessarily, the reference signal required for this purpose had to have extremely accurate and stable phase characteristics to maintain the fidelity of the reproduced color to the color of the scanned element of the televised scene.

It is also characteristic of a parallel scan system in which the beam is wobbled and modulated in intensity in synchronism therewith, that for a given beam current there is a maximum attainable brightness of a given color. This maximum is limited by the fact that the beam is time-modulated by signals representative of that color and traverses a strip emissive of that color only about one third of the time.

There are also other cathode ray tube systems in which it is desired to derive, solely from the scanning of a beam-intercepting structure signals which, in the course of the scanning of each path, indicate the position of a beam as measured in a direction perpendicular to the axis of the scanning path and/or which indicate the linearity of the rate at which the paths are scanned.

It is therefore one object of the invention to provide cathode ray tube systems of the parallel-scan type which do not require wobbling of the beam in order to produce continuously varying indexing signals.

Another object of the invention is to provide a novel beam-indexing system for cathode ray tube systems of the type described which do not require circuits for providing a stabilized reference signal wave.

Still another object of the invention is to provide a color television receiving system capable of reproducing color images with greater brightness.

Another object of the invention is to provide an improved beam-position indexing system for cathode ray tubes which indicates the position of the beam as measured in a direction perpendicular to the axis of its scanning path.

A further object of the invention is to provide a beam-position indexing system for a cathode ray tube system which can indicate the position of the beam in a direction transverse to the direction of scanning and also can indicate the linearity of the rate at which the beam scans each path.

Another object of the invention is to provide a beam-intercepting structure for cathode ray tubes which generates in response to the scanning of an electron beam thereupon, a plurality of simultaneous signals for indicating the position of the beam.

These objects as well as others which will appear are achieved, according to my invention, by a novel cathode ray tube system including a cathode ray tube wherein an electron beam is scanned in a plurality of essentially parallel paths across a beam-intercepting structure which contains a fluorescent portion and at least two sets of indexing elements. The scanning of the beam over the indexing elements generates at least two indexing signals which have characteristics relative to one another that indicate the instantaneous position of the beam as measured in a direction substantially perpendicular to the direction in which the scanning paths extend.

One utilizable characteristic of these two signals is their mutual phase relation. This relation may be used for controlling the position of the beam in a direction transverse to the direction in which the scanning paths extend.

In a form of the invention as embodied in a color television receiving system the fluorescent portion comprises a plurality of sets of electron-sensitive elements disposed in a first direction which when scanned by a beam, fluoresce in different colors corresponding to colors of the televised scene. When a signal is received whose phase represents colors of the televised scene, the phase information of the incoming signal and of the indexing signals is utilized to produce other signals which control the instantaneous position of the beam in a direction transverse to the axis of the scanning path so that during the course of the scanning of each path it is made to traverse fluorescent elements emissive of the same colors as those which the incoming signal then represents. Alternatively, the mutual phase characteristic of the indexing signals may be used to establish a predetermined average position of the beam throughout the scanning of each path, the average position being measured in a direction transverse to the axis of the scanning path.

A feature of the present invention is that the arrangement of the beam-intercepting structure itself, rather than the deflection of the beam, is used to give rise to all of the cyclical indexing signals required to control the position of the beam as the latter scans the indexing elements. The indexing portion of the structure comprises a plurality of sets of indexing elements so disposed that during the course of the scanning of selected scanning paths, elements of two or more sets are traversed by the beam. The elements of each set are spaced substantially equidistant from one another measured in the direction of scanning. The elements of each set also have axes which intersect the axes of elements of at least one other set in a regular pattern, the points of intersection thereof lying on substantially straight parallel lines which are constructed so as to bear a fixed spatial relation to selected parts of the fluorescent portion of the beam-intercepting structure. Each set of elements is so constructed and arranged that the respective indexing signals generated therefrom may be separated from another. For example, by providing that the materials of the respective sets of elements fluoresce in substantially mutually exclusive parts of the electromagnetic spectrum, i.e., in the ultraviolet and infrared regions, the signals from each set may be detected by devices having corresponding sensitivities. Alternatively, the indexing elements may be composed of the same material in which case one of the sets may contain more elements than does the other so as to permit separation of the indexing signals of different frequencies by conventional frequency-selective beams.

In one form of the invention to be illustrated and described herein one set of indexing elements consists of a plurality of rectilinear strips having a given electron-response characteristic which are spaced equidistant from one another and are disposed substantially perpendicular to the direction in which the beam is scanned. The other set of indexing elements consists of a second set of substantially rectilinear strips having a different response characteristic which are inclined with respect to those of the first set and intersect the latter at a number of points which fall on lines that recur with a given periodicity. The beam-intercepting structure also contains an image-forming fluorescent screen which comprises a plurality of sets of phosphor strips respectively emissive of selected colors which are disposed so that they extend substantially in the same direction as the paths along which the beam is scanned. The two sets of indexing elements are so situated with respect to the phosphor strips that the points at which one set of elements intersects the other are all located opposite the strips of a selected one of said sets of strips, i.e., the red-emissive phosphor strips.

When the beam is deflected over such a beam-intercepting structure in each scanning path it will impinge, whenever it is scanning above the line on which the points of intersection lie, first upon a strip of the first set of indexing elements, then upon a strip of the second set, then upon a strip of the first set again, and will continue in the same alternating sequence throughout the rest of that scanning path. When the beam scans below the line in which the points of intersection fall the opposite sequence of scanning occurs, i.e., it will impinge first upon a strip of the second set, then upon a strip of the first set, and so on. Thus signals generated by scanning below the line will be out of phase with respect to signals generated above the line. The mutual phase relation of the signals generated in any scanning line thus provides information as to which side of the line the beam is scanning. It is also characteristic of this form that the phase difference between the two signals generated when the beam is scanning on one side of the line will vary directly with the displacement of the beam from the intersections.

The signals generated by the impingement of the beam on the indexing elements first are manifested as radiant energy signals, i.e., ultraviolet and infrared flashes of light respectively. These radiation signals are converted into electric signals by placing in proximity to the indexing elements devices which are responsive to ultraviolet and infrared light respectively. These devices may take the form of ultraviolet and infrared sensitive photomultiplier tubes which are positioned, for example, opposite radiation-transparent windows formed in the walls of the flared portion of the cathode ray tube. The electric signals generated by the photosensitive devices are applied to appropriate electrical circuits for controlling the position of the beam, in an instantaneous system, to correspond to the hue of the element of the scene being televised as will be explained in detail in the description below.

The invention will be described in greater detail with reference to the appended drawings forming part of the specification and in which.

Figure 1:
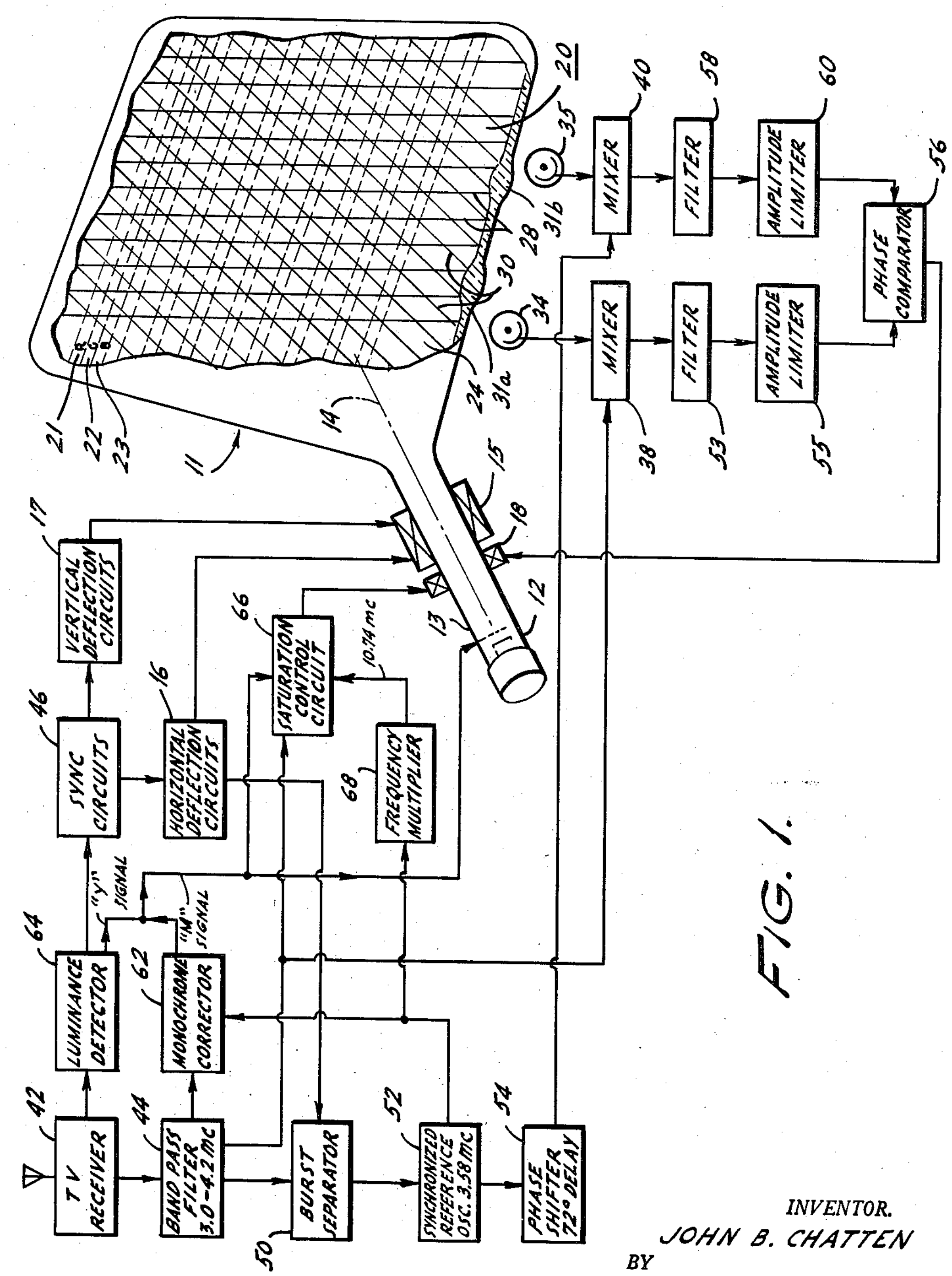
FIG. 1 is a block diagram, partly schematic, showing one form of a cathode ray tube system in accordance with the invention.

Referring to FIGURE 1 a complete color television image reproducing system is shown which incorporates one form of the present invention. This system comprises a color television reproducing tube 11 containing a cathode 12, a control grid 13, and various other electrodes (not shown) which are used to shape and accelerate a beam 14. The beam 14 is deflected in a succession of essentially parallel paths from left to right over the beam-intercepting structure 20 in response to magnetic fields created in the horizontal and vertical windings of a conventional deflection yoke 15. The yoke 15 is supplied with horizontal and vertical deflection signals from the horizontal and vertical deflection circuits 16 and 17 respectively which are triggered by appropriate synchronizing pulses from the synchronizing circuits 46. The synchronizing circuits 46 are supplied with the synchronizing signals present in a transmitted color television signal which is detected by a luminance signal detector 64. The detector 64 receives intermediate frequency signals from a conventional receiver 42 comprising a tuner, mixer, and intermediate frequency circuits.

The beam-intercepting structure 20 (pictured enlarged in FIG. 2) comprises an image-forming portion consisting of a plurality of sets of essentially rectilinear phosphor strips 21, 22 and 23 indicated by the dashed lines deposited on the internal surface of the faceplate of the tube 11. They extend in a direction substantially parallel to the direction in which the beam 14 is scanned in each path. Each of the sets of strips is emissive of a different one of the three additive primary colors, i.e. red, green and blue, when struck by the electron beam 14.

An electron-permeable layer 24, which may be constructed of a light-reflective metal such as aluminum, is deposited on the rear surface of the strips 21, 22 and 23 for preventing "ion spot" and for increasing the brightness of the image reproduced.

The structure 20 also contains one form of a beam-indexing portion constructed according to my invention comprising a first set of indexing elements 28 disposed on the rear sufrace of the layer 24 and which are positioned substantially perpendicular to the direction in which the beam 14 is scanned, and a second set of elements 30 which are parallel to one another and are slightly inclined with respect to the elements 28 so that they intersect the latter, all points of intersection of the two sets of elements being located, as shown, behind the red-emissive phosphor strips 21. In the form of the invention shown in FIG. 1, the elements 28 are composed of an ultraviolet-light-emissive phosphor such as the phosphor known as "P–16" whereas the elements 30 are composed of an infrared-light-emissive phosphor such as the phosphor known as "P–13."

As the beam 14 is deflected by the conventional yoke 15 in paths extending across the structure 20 it will first scan upon elements of one set of indexing elements and then upon the other set in alternating sequence, assuming that it is being scanned either above or below the points of intersection of the indexing elements. In an illustrative case if it is assumed that it scans along any one of the green emissive phosphor strips 22 there will be a predetermined time interval between beam impingements upon an element 30 and an adjacent element 28 and a corresponding predetermined phase displacement between the respective infrared and ultraviolet signals generated by these elements. If, on the other hand, the beam 14 is scanning along any one of the blue-emissive phosphor strips 23 there will be a different interval between beam impingements upon an element 30 and its adjacent element 28 and therefore also a different phase displacement between said infrared and ultraviolet signals. When the beam 14 is scanned along the red emissive strips 21 it will impinge upon the elements 28 and 30 simultaneously since they intersect opposite the strips 21 so that the respective ultraviolet and infrared radiation signals will be substantially in phase with one another.

Windows 31*a* and 31*b*, which are transparent to the radiation signals, are formed in the wall of the flared portion of the cathode ray tube 11. Opposite the windows 31*a* and 31*b* are located photosensitive devices 34 and 35 which are sensitive to infrared and ultraviolet light respectively. The devices may consist of conventional photomultiplier tubes which transform the energy radiated from the indexing strips into corresponding electrical signals. In an illustrative case, the number of indexing elements within the tube and the rate at which they are scanned by the beam 14 will cause the devices 34 and 35 to produce electrical signals having a frequency of about seven megacycles. These electrical signals will also have a certain mutual phase relation depending upon whether the beam scans along, below, or above the red phosphor strip in each of its scanning paths, as explained previously.

As has been stated before, the signals produced by the indexing elements may be used to control, during the course of the scanning of each path, either the average position of the beam as measured in a vertical direction, or the instantaneous vertical position of the beam so as to determine upon which strip it will instantaneously impinge, and hence which color will be emitted from the screen 20, at any instant. FIGURE 1 depicts a form of the invention wherein indexing signals are combined with the incoming color signal in such a way that the beam is instantaneously caused to traverse a strip emissive of the hue of which the incoming color signal is then representative.

To accomplish this instantaneous control each of the indexing signals is mixed with another signal, i.e., one indexing signal is mixed with a reference oscillatory wave at the color subcarrier frequency having a phase corresponding to the phase of the modulated color subcarrier when a red element of the televised scene is scanned, since the indexing strips intersect opposite red-emissive strips, and the other indexing signal is mixed with the chrominance components of the incoming signal. Signals resulting from the mixtures thereof are then compared in phase so as to produce an error signal having the desired characteristics.

These operations are accomplished in the apparatus depicted in FIG. 1 by applying to one input of the mixer 40 an oscillatory wave at the frequency of the color subcarrier but having a phase of 103° which is the standard phase of the modulated subcarrier in the received color television signal which corresponds to red. The $B-Y$ signal is considered as having 0° phase. This reference oscillatory wave is derived by first producing an oscillatory wave at 3.58 mc. in response to the incoming "bursts" of the synchronizing color subcarrier appearing on the "back porch" of the horizontal blanking pulses. These bursts are separated from the incoming signal by applying the chrominance components from the bandpass filter 44 to a conventional burst separator 50 which may comprise, for example, a gated amplifier tube. To another input of the separator 50 a burst "flag" or gating pulse, which occurs during the back porch intervals of the horizontal blanking pulse, is applied from the sync circuits 46 causing the burst separator 50 to conduct and produce a signal in its output only when the burst flag is applied thereto. The separated burst is applied to a synchronized reference oscillator 52 which produces a wave having a frequency of 3.58 mc. that is locked in phase with the phase of the incoming burst. Since the incoming burst has a phase which leads the $B-Y$ signal by 180° (i.e., it is a $-(B-Y)$ signal) the 3.58 mc. wave appearing at the output of the oscillator 52 is applied to a phase shifter 54 where it is delayed by 77° and becomes a 3.58 mc. wave having a phase of 103°, i.e., the phase representing red. This latter wave is then applied to a second input of the mixer 40.

In the output of the mixer 40 several signals will appear one of which has a frequency which is the sum of the indexing signal at 7 mc. and of the 3.58 mc. oscillatory wave supplied from the phase shifter 54. This output signal is applied to a filter 58 which is constructed to pass substantially only the sum frequency wave at 10.58 mc. The 10.58 reference oscillatory wave is then applied to a conventional amplitude limiter 60 whose output is coupled to one input of a conventional phase comparator 56. The amplitude limiter 60 is designed to confine amplitude variations in the reference oscillatory wave to a predetermined range so that its phase may be more accurately compared with the phase of the signal applied to the other input of the comparator 56.

It is also desired to supply to the other input of the comparator 56 a signal for comparison having a central frequency of 10.58 mc. and a phase which corresponds to the color of the elements of the scene being televised. To obtain such a signal, the 7 mc. indexing signal in the output of the photosensitive device 34 is applied to one input of the mixer 38 and the chrominance components of the incoming signal are applied from the bandpass filter 44 to the other input thereof. The mixer 38 produces a number of output signals among which will appear a sum signal having frequencies within the range 10–11.2 mc., i.e., the sum of the 7 mc. indexing signal from the photosensitive device 34 and the chrominance component frequencies 3.0–4.2 mc. These sum frequencies will have phase variations corresponding to the hue of the element of the scene being televised. They are filtered out of the output signal of mixer 38 by a filter 53 and are then applied to the limiter 55 which is substantially of the same construction as the limiter 60 and which also serves to confine the amplitude variations of the sum frequencies within a predetermined range so that when they are applied to the phase comparator 56 an accurate phase comparison may be made.

The phase comparator 56 will produce an output error signal when the phase of the signal supplied thereto from the limiter 55 is not the same as the phase of the reference signal from the limiter 60. When the phase of the signal from limiter 55 is such as to represent blue, for example, an error signal will be produced having a polarity and amplitude such that when it is applied to an auxiliary vertical deflection coil 18 it will cause the beam to move vertically until it scans along one of the blue-emissive strips 22. When the phase of the limiter 55 output signal represents other colors, other error signals will be produced by comparator 56 for moving the beam to the desired phosphor strip.

The parts of FIG. 1 whose functions have been explained thus far may be termed the "hue selection servo" since they operate to govern the vertical position of the beam (and hence the hue produced by the beam) solely in accordance with the hue represented by the chrominance components. To obtain a more realistic reproduced image of the scene televised it is also desirable, however, to provide means for insuring that the saturation of the colors produced by the scanning of the beam on the phosphor strips 21, 22 and 23 conforms to the saturation of the elements of the scene being scanned. Toward this end the system shown in FIG. 1 also includes a circuit 66 (described more fully hereinafter with reference to FIG. 3) for controlling the saturation of the colored elements of reproduced image.

The circuit 66 is coupled to a so-called monochrome corrector 62 (described more fully hereinafter with reference to FIG. 4), the bandpass filter 44, and to the frequency multiplier 68 which multiplies the frequency of the output wave of oscillator 52. In response to input signals supplied from these components the circuit 66 produces an output signal which consists of an amplitude modulated wave at 10.74 mc., i.e., the third harmonic of 3.58 mc. This wave is applied to the auxiliary deflection coil 18 so as to impart to the beam a vertical "wobble" whose amplitude is inversely proportional to the saturation of the hue represented by the incoming chrominance components. The wobbling of the beam 14 at a high frequency will result in the beam tracing a sinusoidal path about a median position determined by the action of the hue servo system so that the beam will likewise impinge on adjacent phosphor strips. For example, if the chrominance components represent a saturated red element the hue selection servo system will cause the beam to scan only along a red-emissive phosphor strip and no auxiliary vertical wobble signal will be supplied by the saturation control circuit 66. However, if the incoming chrominance components represent a pink-colored element, the hue selection servo will adjust the vertical position of the beam so that it traverses a median path centered on red-emissive strip, and the saturation control circuit 66 will simultaneously supply a wobble signal to coil 18 causing the beam to be wobbled up and down so as to impinge on the blue and green phosphor strips adjacent the median red-emissive strip, thereby desaturating the red color of the element being reproduced. The amplitude of the wobble is a function of the desaturation desired, so that when a greater pastel effect is to be produced, the greater the amplitude of the 10.74 mc. signal from the circuit 66 will be.

Having explained the functions of the hue servo and the saturation control circuits the functioning of the system of FIG. 1 to display the elements of the reproduced scene with proper brightness will now be considered. Since the fidelity of a reproduced color image depends not only on the correctness of the hue and saturation of the component colors thereof, but also on their brightness, the system shown in FIG. 1 also contains apparatus for reproducing the correct brightness of the elements of the colored image. This apparatus is especially suitable for a single gun color television display device of the type described and is schematically represented by block 62. Such apparatus is very often employed in single gun display systems when a standard video signal of the type approved for U.S. broadcast is received since the direct application of a standard signal to control the intensity of the cathode ray of a single beam tube would result in incorrect brightness reproduction. The standard color video signal contains a monochrome component representative of the brightness and is constituted of 59% of the green-representative signal, 30% of the red-representative signal, and 11% of the blue-representative signal. For a single gun display device of the type illustrated it is desirable to modify this standard signal so as to obtain a composite "M" signal which will have a composition of ⅓ of the green-representative signal, ⅓ of the red-representative signal, and ⅓ of the blue-representative signal. This composite "M" signal is then applied to the control grid 13 of tube 11 for modulating the intensity of the scanning beam 14.

Although correction of the luminance signal is not necessary for the operation of the present invention, the inclusion of the monochrome corrector 62 is preferred, as has just been explained, for the functioning of the saturation control circuit 66 which enables the system of FIG. 1 to produce images in other than just saturated primaries. Accordingly a brief description of its function will now be set forth and a more detailed analysis will follow in connection with the description of FIG. 4.

The apparatus for modifying the standard luminance signal for the single-gun display tube 11 comprises the monochrome corrector 62 and the luminance detector 64. The corrector 62 is supplied with chrominance components from the bandpass filter 44 and with a wave at the subcarrier frequency from the reference oscillator 52. After processing and modifying these two input signals, the corrector 62 produces an output signal which is added to the output "Y" signal of the luminance detector 64 to obtain the "M" signal which is used to vary the voltage on the control grid 13 so as to modulate the intensity of the electron beam 14 accordingly.

To facilitate comprehension of the operation of the overall system of FIG. 1, a more detailed explanation of some of its components will now be undertaken.

*Operation of the Hue Selection Servo*

Figure 2:
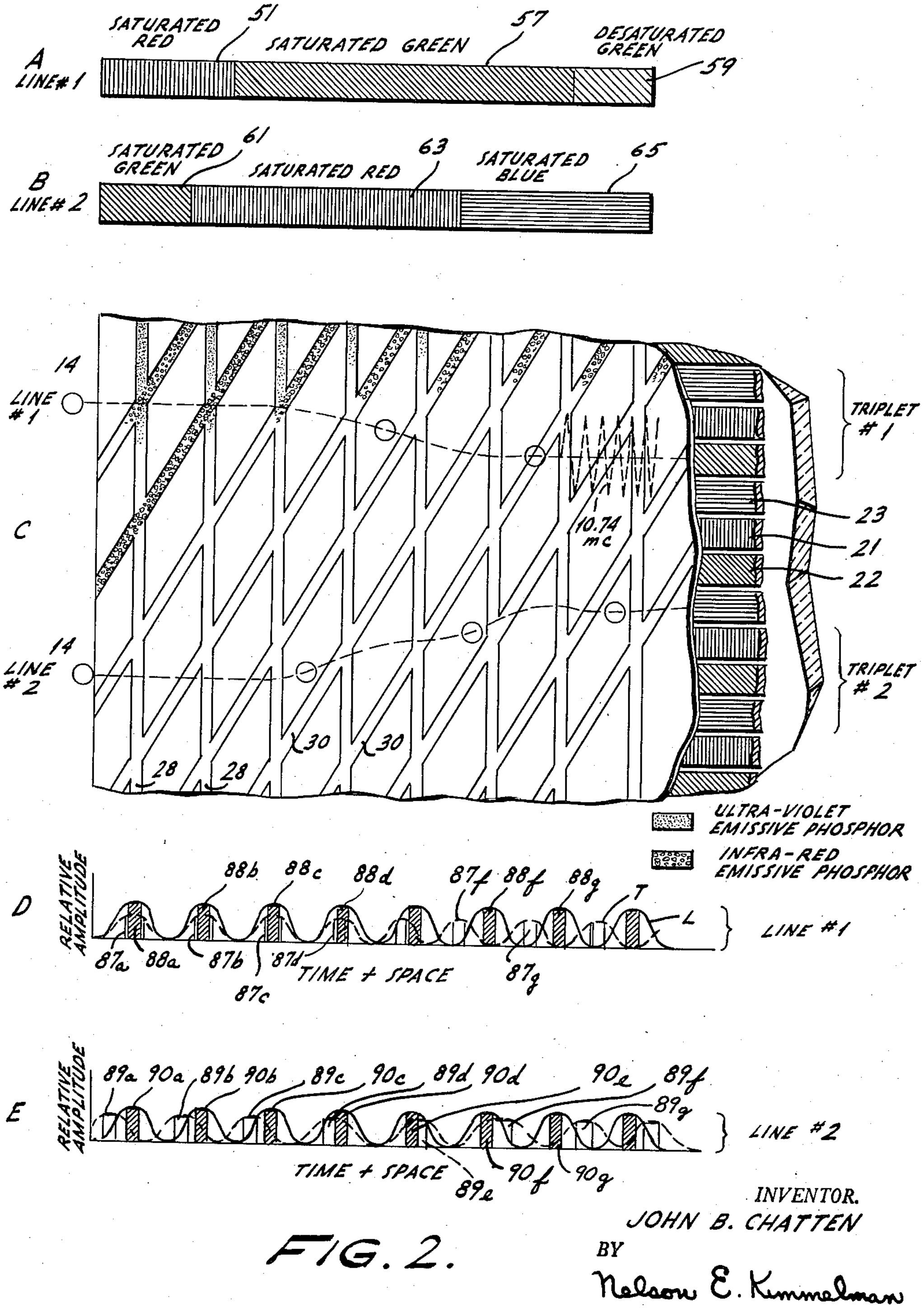
FIG. 2 is a five part schematic and graphical representation of the operation of the system shown in FIG. 1.

The operation of the system of FIG. 1 relating particularly to my novel hue selection servo system will now be considered in more detail, especially in connection with parts A, B, C, D and E of FIG. 2. Assume that the beam 14, whose spot is shown in part C of FIG. 2, is about to be scanned from left to right across the structure 20 shown in FIG. 2. Assume further that the first line segment of the scene televised is as shown in part A and that the corresponding first line of the image will be produced by the scanning of the three adjacent phosphor strips indicated as "Triplet #1." As shown, the first line of the scene televised consists of a saturated red portion 51, followed by a saturated green portion 57, followed by a desaturated green portion 59. At the beginning of the scan of this line it is further assumed that the beam 14 is positioned by the operation of the vertical portion of deflection yoke 15 opposite one of the red-emissive phosphor strips 21 so that as it begins to move toward the right it traverses the first two pairs of elements 28 and 30 at their intersections during which time the red portion 51 of line #1 of the scene televised is being scanned. In so doing flashes of infrared and ultraviolet light respectively are produced which are converted by the photosensitive devices 34 and 35 respectively into the corresponding pairs of electrical pulses 87*a*, 87*b*, and 88*a*, 88*b*, illustrated in FIG. 2, part D. The unshaded pulses 87, corresponding to the infrared flashes are shown, solely for clarity of explanation, as having a lesser amplitude than the shaded pulses 88 which correspond to the ultraviolet flashes. The first two pairs of pulses applied to the input circuits of the mixers 38 and 40 (FIG. 1) are essentially in phase and are smoothed out by the frequency characteristics of the input circuits to form parts of the solid line curve L and the dashed-line curve T shown in parts D and E. The two sine waves applied to the mixers 38 and 40 (FIG. 1) are essentially in phase and are smoothed out by the frequency characteristics of the input circuits to form parts of the solid line curve L and the dashed-line curve T in parts D and E. The two sine waves applied to the mixers 38 and 40 respectively from the filter 44 and the phase shifter 54 are also in phase since the reference wave from shifter 54 is maintained at a red-representative phase (103°) and the chrominance wave from filter 44 has a phase corresponding to the saturated red portion 51. After mixing of the two pairs of waves in mixers 38 and 40, the sum frequencies of their output waves are passed by the filters 53 and 58, via the amplitude limiters 55 and 60, to the two quadrature inputs of a conventional phase comparator 56. The comparator 56 will therefore supply a zero error signal to the auxiliary deflection coil 18 and the beam 14 will continue to scan along the red-emissive strip 21.

However, it will be noted that at a time just after the beam 14 scans the second pair of indexing elements, the color of the scanned portion 57 of the televised scene becomes a saturated green. The inertia of the system is such that the beam will travel slightly further along the red-emissive strip giving rise to the two pairs of indexing pulses 87*c*—87*d* and 88*c*—88*d*. The chrominance wave applied to mixer 38 from filter 44 which then represents the green portion 57 will assume a phase of 241° i.e., the standard phase representing green, whereas the reference wave from phase shifter 54 remains at 103° phase. When these signals are combined with the respective indexing pulses 87*c* and 88*c* from devices 34 and 35 the respective sum frequencies separated from the output signals of mixers 38 and 40 by the filters 53 and 58 will also have a phase difference which is detected by the phase comparator 56 which thereupon produces an error signal. This error signal initially is relatively large and is applied to coil 18 and causes the beam 14 to begin to move downward until it scans along the adjacent green-emissive phosphor strip 22, the error signal lessening in amplitude as the beam approaches the strip 22. As it scans along the phosphor strip 22 it should be observed that the phase of the two sets of pulses 87 and 88 has changed, i.e., the pulses 87*d*—87*g* now lead the pulses 88*d*—88*g* in phase. The phase difference between the pulses 87*d*—87*g* and 88*d*—88*g* will be opposite and substantially equal to the phase difference between the signals applied to comparator 56 from the shifter 54 and filter 44 so long as the beam is scanning along the green emissive strip and the comparator 56 will continue to produce a minimal error signal.

The final element 59 of the first line of the scene televised has a desaturated green color. Thus, a scanning adjustment must be made because the beam 14, when scanning along the strip 22, produces only a saturated green since the servo system merely adjusts the hue. To produce a desaturated green the beam is "wobbled" in a vertical direction by the application to the auxiliary coil 18 of a signal from the saturation control circuit 66 at a frequency of 10.74 mc. which has an amplitude corresponding to the degree of desaturation desired. The wobbled beam impinges partly on the adjacent red-emissive phosphor strip 21 and partly on the adjacent blue-emissive phosphor strip 23 as shown in part C of FIG. 2 thereby adding a certain amount of magenta to the green. If the final element 59 of line #1 were desaturated even more, the peak-to-peak amplitude of the 10.74 wobble would be even greater; conversely, if it were more saturated the amplifier of the wobble would be less.

As shown in FIG. 2, part B, line #2 of the scene televised consists of an initial saturated green portion 61, followed by a saturated red portion 63, followed by a saturated blue portion 65. Assume that the beam 14 at the beginning of the second line is positioned by the action of the vertical deflection windings of yoke 15 at a point opposite the green emissive strip 22 of triplet #2 and then begins to scan along it. At first the pulses 89 will lead the pulses 90 in phase as shown in part E. When the chrominance signal from filter 44 undergoes a change in phase corresponding to the scanning of the saturated red portion 63 of line #2, it will assume the same phase as the reference signal from phase shifter 54. When these two signals are combined with the filtered pulses 89*b*—89*c*, and 90*b*—90*c* and applied to comparator 56, the latter will produce an error signal which will be applied to coil 18 whereupon the beam will be caused to move up and scan along intersections of the indexing elements opposite the red-emissive strip. In so doing the beam will cause the in-phase pulses 89*e*—89*f*, and 90*e*—90*f* to be produced. When these pulses are then combined with the reference and chrominance waves in the mixers 38 and 40 and the sum frequency waves in the outputs of the latter are applied to the comparator 56, a minimal error signal will be produced which will cause the beam to continue to scan along the red-emissive strip until the equilibrium condition is again disturbed.

This equilibrium will be upset again when the phase of the incoming chrominance component corresponds to the saturated blue portion 16 of line #2. There will then be a new difference between its phase and that of the reference wave. These signals are added, in the mixers, to the in-phase indexing signals generated by the scanning of the beam along the red-emissive strip and the two sum frequencies are applied to the comparator 56 which thereupon produces an error signal that will cause the beam to be raised until it scans along the blue-emissive strip. When this happens the phase difference between the indexing signals 89*f*—89*g* and 90*f*—90*g* will be substantially equal to and opposite the phase difference between the reference and the chrominance signals so that once again the phase comparator 56 will produce a minimal error signal which will cause the beam to continue to traverse a blue-emissive strip until the phase of the incoming chrominance signal changes. It will be observed that the hue selection servo tends to maintain a minimal error signal condition. With such a system it is possible to achieve a brighter picture for a given beam current than is produced by other parallel-scan systems in which the beam is time-modulated by a sequence of color-representative signal samples since the full beam current is always used to produce the desired colors. It will be appreciated that no external oscillator is needed to generate a signal with which the phase of the indexing signals is compared in order to derive information as to the position of the beam. Furthermore, the beam is not wobbled to produce a cyclically varying indexing signal but only to introduce the correct saturation characteristics produced into the reproduced image.

*Saturation Control Circuit*

Figures 3, 4, 5:
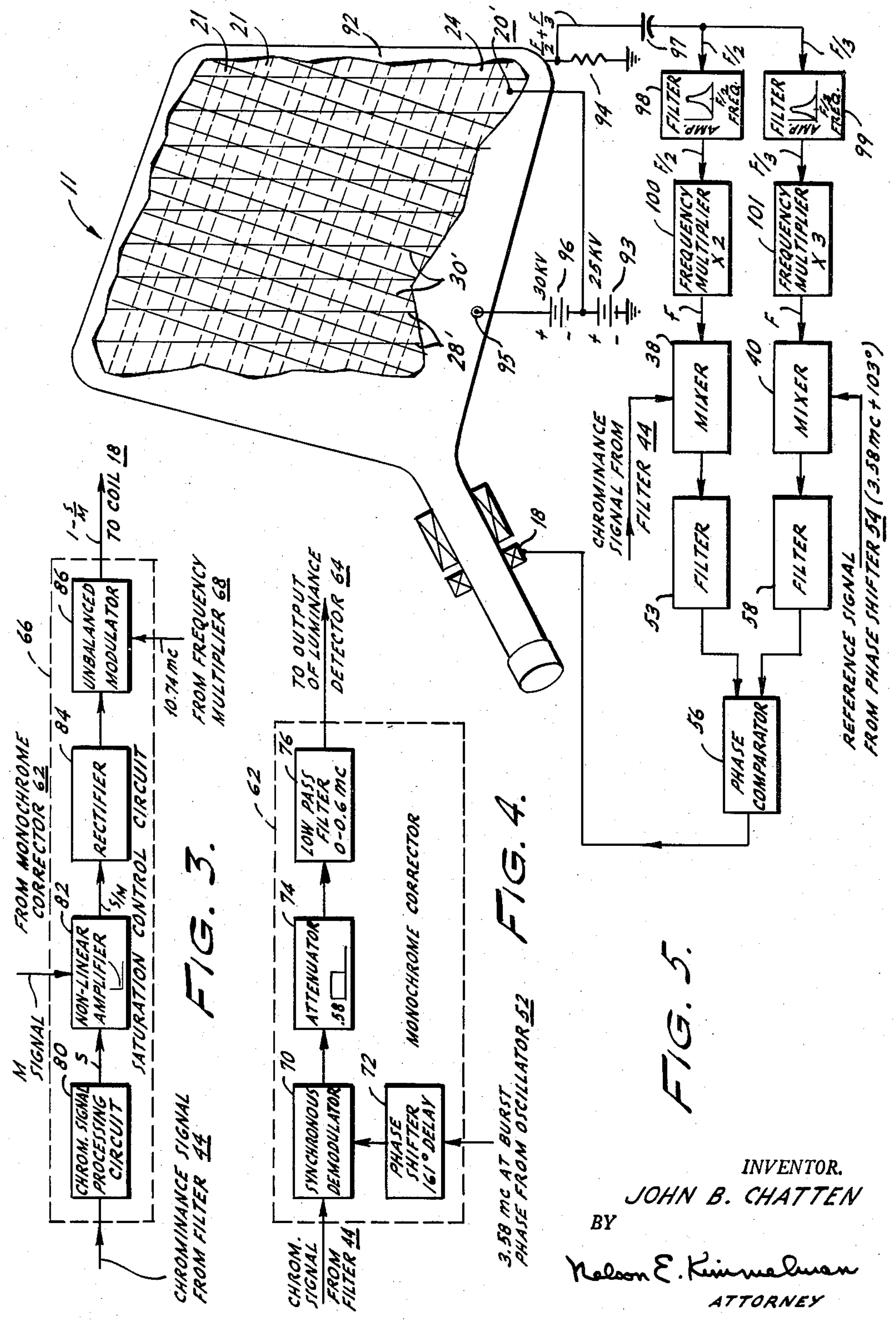
FIGURES 3 and 4 are block diagrams of two of the components of the system of FIG. 1.
FIGURE 5 is a block and schematic diagram of another form of the invention.

FIGURE 3 shows within the broken line rectangle 66 the components of a typical saturation control circuit. As stated above, the novel hue selection servo of which the comparator 56 is a part serves to determine the vertical position of the beam so as to control instantaneously the hue of the light being emitted from the screen 20 at any given time, but does not account for the saturation of that hue, i.e., the amount of white mixed therewith. It was shown above that if it is desired to produce pastel colored images the beam 14 is wobbled at a high frequency by a 10.74 mc. signal from the circuit 66. The apparatus within rectangle 66 produces this signal by first transforming the incoming chrominance signal, which is constituted according to the applicable standards laid down for U.S. color television broadcast transmission, into a so-called "S" signal comprised of a symmetrical set of three vector components at 120° phase difference. This transformation is effected by the chrominance signal processing circuit 80. Such circuits are well known and may, for example, be of the type disclosed in the copending application of S. W. Moulton and J. S. Bryan, Serial No. 323,234, filed November 29, 1952. The "S" signal appearing in the output of the processing circuit 80 is then applied to one input of a non-linear amplifier 82. To another input of the amplifier 82 the "M" signal from the monochrome corrector 62 is applied. The amplifier 82 has the characteristics shown by the graph within the block, i.e., its amplification characteristic varies non-linearly and inversely with the amplitude of the applied "M" signal, being high when the "M" signal is low and vice versa. As a result, the amplifier 82 produces an output signal $$\frac{S}{M}$$

which is applied to a rectifier 84 which detects only the video frequency components of the chrominance signal and passes them to one input of the unbalanced modulator 86. To another input of the modulator 86 the third harmonic of the subcarrier, i.e., 10.74 mc., is also applied from the frequency multiplier 68. In the output of the modulator 86 a signal $$1-\frac{S}{M}$$

where $$\frac{S}{M}=1$$

on primaries, is produced which will have zero amplitude when the colors represented by the incoming chrominance components are saturated and will have other amplitude values when they are desaturated. The amplitude (peak-to-peak) of the 10.74 mc. signal applied to the coil 18 is directly proportional to the degree of desaturation of the color represented by the chrominance signal.

*Monochrome Corrector*

The apparatus shown in FIG. 4 converts the standard monochrome component of the incoming signal to the monochrome component "M" which is desirable in single gun display tube systems. The chrominance components from the bandpass filter 44 are applied to a conventional synchronous demodulator 70 where they are demodulated by a wave at the subcarrier frequency of 3.58 mc. which has a phase which leads the $B-Y$ component of the incoming signal by 19°. This demodulating wave is obtained by applying the output wave of the synchronized reference oscillator 52, which leads the $B-Y$ component in phase by 180°, to the synchronous demodulator 70 by way of a conventional phase shifter 72. Phase shifter 72 may be a delay line, for example, constructed to introduce 161° delay into the signal applied to it. After demodulation of the chrominance components by the wave at 19° phase, the output signal of the demodulator 70 is applied to an attenuator 74 which is constructed to pass 58% of the input signal to a low pass filter 76 which has a passband of 0–0.6 mc. Signals from the low pass filter 76 are then added to the output signal from the luminance detector 64 to produce the "M" signal which is comprised of equal thirds of the red, green and blue representative signals. The "M" signal is applied to the control grid 13 for controlling the intensity of the beam. Any other apparatus for deriving the "M" signal may alternatively be used, as for example, the apparatus described in the copending U.S. application of S. W. Moulton Serial No. 290,775, filed May 29, 1952.

In the foregoing form of the invention, the response of the indexing elements to electron-impingement thereupon differed physically, i.e., they radiated light of different frequencies. As stated before, even if the indexing elements are made of the same material and exhibit the same physical response to electrons impingement thereupon, they may be so constructed and arranged that their respective responses are differentiable solely by electronic techniques. A form of the invention employing a hue selection servo in which this type of separation is used is shown in FIG. 5. Parts of FIG. 5 which are identical to those of FIG. 1 are identically numbered; parts which are similar thereto bear primed numbers. The indexing elements 28′ and 30′ are both constituted of the same secondarily-emissive material but, as measured in a horizontal direction, there are 50% more of the elements 30′ than there are of the elements 28′. The indexing elements are maintained, by virtue of a lead connecting the metallic layer 24 to a battery 93, at a positive potential of about 25 kv. which is somewhat lower than the potential 30 kv. applied to the internal second anode coating. The second anode coating is connected to the battery 96 by a lead running from the button 95. Thus when the beam 14 impinges upon the indexing elements 28′ and 30′ secondary electrons are emitted therefrom which are attracted to the more positive second anode coating thereby driving the layer 24 more positive. Changes in the potential of the coating 24 cause a corresponding displacement current to flow from the conductive ring 92, which is fitted closely around the rim of the faceplate of tube 11, across the load resistor 94. Accordingly, there will appear across the latter resistor two signals, one having a frequency F/2 and the other a frequency of F/3, which correspond to the signals produced by the scanning of the indexing elements 30′ and 28′ respectively. Both of these signals are applied via the coupling capacitor 97 to the filters 98 and 99. The filter 98 is adapted to discriminate substantially against all frequencies other than the frequency F/2, whereas the filter 99 is constructed to discriminate against all signals having frequencies other than the frequency F/3. There will thus appear in the outputs of the filters 98 and 99 respectively the signals F/2 and F/3 which are applied to conventional frequency multipliers 100 and 101 respectively. Since the frequency multiplier 100 doubles the frequency of the signal applied to it there will appear in its output a signal F. On the other hand, the frequency multiplier 101 will triple the frequency of the F/3 signal applied to it so that in its output there will also appear a signal F. The phase relation between the two F signals from the frequency multiplier will vary according to whether the beam scans along, above or below one of the red-emissive strips 21 as explained in connection with the preceding FIGS. 1 and 4.

These two indexing signals having a frequency F are applied to mixers 38 and 40 respectively together with the chrominance components and the reference wave in the same manner as in the system of FIG. 1. The respective sum frequencies of the two input waves of the mixer 38 and 40 are then filtered out by the filters 53 and 58 (which may also include amplitude limiting means as shown in FIG. 1) and are applied to the two inputs of a phase comparator 56 which produces an error signal which is applied to coil 18. This error signal adjusts the vertical position of the beam so as to control the instantaneous hue of the color produced by the beam on the beam-intercepting structure 20′ in the same manner as explained hereinbefore in connection with FIGS. 1 and 2.

Figure 6:
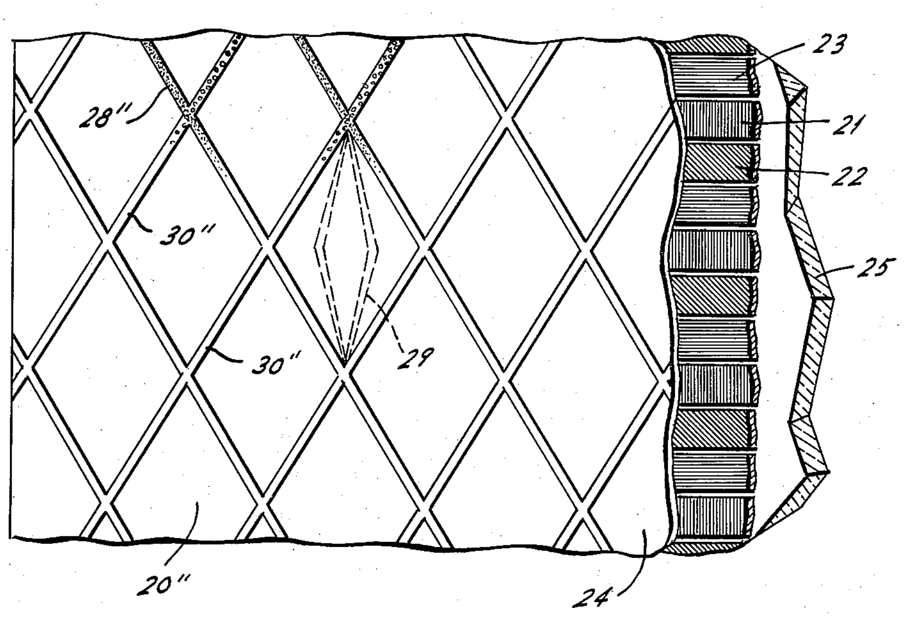
FIGURE 6 is an enlarged and partly sectional view of a beam-intercepting structure according to still another form of the invention.

FIGURE 6 shows another possible arrangement of the indexing portion of a beam-intercepting structure 20″ according to my invention. Both sets of indexing elements 30″ and 28″ are diagonally disposed and are shown as being made of infrared and ultraviolet emissive phosphor materials respectively. It may be seen that when a beam scans across the beam-intercepting structure 20″ indexing signals will be generated having relative phase relations depending upon the vertical position of the beam. If desired the indexing elements 28″ and 30″ may also be disposed closer to one another in a horizontal direction thereby forming narrower diamond-shaped configurations such as configuration 29 shown in dotted lines. By so doing the number of signals available to the indexing signal circuit within the scanning of each horizontal line is increased but the relative phase difference between the signals as a function of the vertical displacement of the beam will remain the same. In all other respects, the structure 20″ is interchangeable with the structure 20 shown in FIG. 1.

The invention described in the present application has many uses. While it has been explained in connection with color television systems it is apparent that it is also useful in other types of display systems. It may be desired for example, in display systems which employ a plurality of vertical phosphor strips emissive of different colors which are scanned transversely by an electron beam, to control the vertical position of the beam during the course of successive scans. In such a case it might be possible to utilize one set of the phosphor strips as the vertical indexing elements (similar to the vertical indexing strips 28 of FIG. 1) and a set of electron-sensitive indexing elements which emit say ultraviolet light which are inclined relative to the vertical strips. Thus a photosensitive device sensitive to the color emitted by the vertical phosphor strips and another one sensitive to ultraviolet light would be employed therewith to generate two sets of indexing signals in a manner similar to the operation of the apparatus shown in FIG. 1.

The indexing system shown herein can also be used to advantage in helping to insure good vertical interlace. For example, the structure shown in FIG. 6 is such as to produce signals, when adjacent triplets of color phosphors are scanned, which have different phase relations and thus information would be available to distinguish between even and odd lines. If the system is one in which only the average position of the beam during the scanning of a line is to be controlled this may be of use in assisting the performance of special purpose tubes in which scanning along straight lines is a critical requirement.

It should be appreciated also that if the signals from each set of indexing elements can be separated from the other, the indexing structure can be utilized not only to control vertical position but also to measure the horizontal rate of scanning of the beam so as to provide information which will assist in maintaining horizontal linearity. The forms of the beam-intercepting structures as shown in FIGS. 1 or 6 are especially valuable for this purpose inasmuch as they contain vertical indexing strips which produce phase indexing signals.

It will be understood that still other applications of the apparatus according to the diverse forms of my invention described herein will occur to those skilled in the art. Consequently, I desire the scope of this invention to be limited only by the following claims.

I claim:

1. A cathode ray tube system comprising a cathode ray tube wherein an electron beam is produced, a beam-intercepting structure which includes first and second sets of indexing elements, means for causing said beam to scan said structure in a plurality of generally parallel paths extending in a first direction, and means for deriving from the scanning of said beam upon said sets of indexing elements two simultaneous signals having a mutual phase relation which indicates the relative position of said beam measured in a second direction substantially perpendicular to said first direction.

2. The system according to claim 1 wherein said first and second sets of indexing elements intersect one another.

3. A cathode ray tube system comprising a cathode ray tube wherein an electron beam is produced, a beam-intercepting structure comprising a fluorescent portion and at least two sets of mutually intersecting indexing elements, said indexing elements being constructed and arranged so that their points of intersection are situated in a predetermined spatial relation to selected areas of said fluorescent portion, means for causing said beam to scan said structure in a plurality of substantially parallel paths extending in a first direction, and means for deriving from the scanning of said beam over said elements two signals having a mutual phase elation which indicates the relative position of said beam measured in a second direction substantially perpendicular to said first direction.

4. The cathode ray tube system according to claim 3 wherein said fluorescent portion of said beam-intercepting structure comprises a plurality of fluorescent strips disposed in said first direction and wherein said points of intersection are disposed in a predetermined spatial relation to selected ones of said fluorescent strips.

5. The cathode ray tube system according to claim 4 wherein said selected ones of said fluorescent strips all exhibit substantially the same response to the impingment of electrons thereupon.

6. The system according to claim 4 wherein said two sets of indexing elements exhibit the same response to the impingement thereupon of electrons.

7. The system according to claim 4 wherein each of said sets of indexing elements exhibits a different response to the impingement of electrons thereupon.

8. A cathode ray tube system comprising a cathode ray tube wherein an electron beam is produced, a beam-intercepting structure which includes at least two sets of indexing elements, means for causing said beams to scan said structure in a plurality of generally parallel paths which extend in a first direction, means for deriving from the scanning of said beam over said two sets of indexing elements two signals having a varying mutual phase relation corresponding to the position of said beam during said scanning as measured in a second direction substantially perpendicular to said first direction, and means responsive to said two signals for controlling the position of said beam in said second direction.

9. The system according to claim 8 wherein said beam-position-controlling means controls the average position of said beam during the course of scanning of selected ones of said paths.

10. The system according to claim 8 wherein said beam-position-controlling means controls the instantaneous position of said beam during the scanning of selected ones of said paths.

11. A television receiver system comprising a cathode ray display tube wherein an electron beam is produced, a beam-intercepting structure which includes two sets of indexing elements and a plurality of sets of electron-sensitive strips which fluoresce in colors corresponding to selected colors of the elements of a televised scene, said two sets of indexing elements being constructed and arranged so that the axes of the elements of each set intersect with the axes of the elements of the other at points bearing a predetermined spatial relation to selected ones of said fluorescent strips, means for causing said beam to scan said structure in a plurality of paths parallel to said fluorescent strips, means including said indexing elements for deriving, in the course of the scanning of said paths, two simultaneous signals having a varying mutual phase relation indicating the position of said beam as measured in a second direction substantially perpendicular to said first direction, a source of a third signal having a fixed phase condition corresponding to one of said selected colors, a source of a fourth signal having a phase which varies corresponding to the hue of the elements being scanned in a televised scene, and means responsive to said four signals for controlling the position of said beam in said second direction.

12. The receiver system according to claim 11 wherein the selected ones of said fluorescent strips to which the intersections of the axes of the indexing elements bear a predetermined spatial relation fluoresce in a given hue, and wherein said third signal has a phase condition corresponding to said given hue.

13. The receiver system according to claim 11 wherein said first and second sets of indexing elements are composed of the same electron-sensitive material.

14. The system according to claim 13 wherein said first set of indexing elements has fewer indexing elements than does said second set.

15. The system according to claim 11 wherein said first and second sets of indexing elements are composed of different electron-sensitive materials.

16. The system according to claim 15 wherein said different electron-sensitive materials emit radiation within substantially different frequency ranges and wherein said means for producing said two signals also includes first and second photosensitive devices sensitive respectively to radiation in said different frequency ranges.

17. The receiver system of claim 11 with the addition of means for causing said beam to scan said phosphor strips in a manner such as to reproduce the saturation characteristic of the hue of which the fourth signal is contemporaneously representative.

18. A cathode ray tube indexing structure comprising two sets of strip-like indexing elements, the elements of each set being substantially parallel to each other but inclined with respect to those of the other set.

19. The structure of claim 18 characterized in that the angle between the elements of one set and those of the other is different from 90° and integral multiples thereof.

20. The structure of claim 18 characterized in that the elements of each said set are spaced substantially equally from each other.

21. The structure of claim 18 characterized in that the elements of both said sets have substantially the same response to electron beam impingement.

22. The structure of claim 18 characterized in that the elements of one said set have substantially different response to electron beam impingement than the elements of the other said set.

23. The structure of claim 18 characterized in that the spacing between adjacent elements measured in a given direction is substantially the same in both said sets.

24. The structure of claim 18 characterized in that the spacing measured in a given direction between adjacent elements of one said set is substantially different from the spacing measured in said given direction between adjacent elements of the other of said sets.

25. A screen structure for a cathode ray tube comprising a plurality of substantially parallel phosphor strips and two sets of indexing strips, the strips of each said set being substantially parallel to each other but inclined with respect to said phosphor strips at angles which are different for the two sets.

26. A screen structure for a cathode ray tube comprising substantially parallel, equally spaced strips of phosphor emissive of light of a given color and intermediate strips of phosphors emissive of light of different colors, and two sets of indexing strips, the strips of each set being substantially parallel to each other but inclined with respect to said color phosphor strips at angles which are different for the two sets.

27. The apparatus of claim 26 characterized in that the strips of one of said sets are perpendicular to said phosphor strips and in that the strips of the other said set are spaced in a direction perpendicular to said phosphor strips by an amount equal to the spacing between said phosphor strips of a given color.

28. The apparatus of claim 26 characterized in that the strips of each said set are spaced apart in a direction perpendicular to said phosphor strips by an amount equal to the spacing between said strips of a given color.

References Cited in the file of this patent

UNITED STATES PATENTS

| | | |
|---|---|---|
| 2,589,386 | Huffman | Mar. 18, 1952 |
| 2,725,420 | Zworykin | Nov. 29, 1955 |
| 2,750,533 | Schwartz | June 12, 1956 |
| 2,790,107 | Bradley | Apr. 23, 1957 |
| 2,878,308 | Moulton | Mar. 17, 1959 |